INFRARED ABSORPTION SPECTRUM OF SAPONIN

INFRARED ABSORPTION SPECTRUM OF SAPOGENIN

United States Patent Office 3,641,243
Patented Feb. 8, 1972

3,641,243
ACTIVE MATERIAL OF *ENTADA PHASEOLOIDES*
Wen Chih Liu, Paramus, N.J., assignor to Pfizer Inc., New York, N.Y.
Continuation-in-part of application Ser. No. 824,216, May 13, 1969. This application Dec. 9, 1969, Ser. No. 883,575
Int. Cl. A61k *27/14*
U.S. Cl. 424—195
2 Claims

ABSTRACT OF THE DISCLOSURE

A saponin powder, obtainable by the evaporation of the methanol-water extract of the ground seeds of the plant, *Entada phaseoloides*, and the purified material as a crystalline solid with the empirical formula, $C_{45}H_{82}O_{27}$, melting at 223–225° C., inhibit Walker 256 tumor in rats.

CROSS REFERENCE TO RELATED APPLICATION

This application is a continuation-in-part of copending application Ser. No. 824,216, filed May 13, 1969 and now abandoned.

BACKGROUND OF THE INVENTION

The testing of plant extracts is an important part of anti-tumor screening programs. This invention is concerned with an active principle extracted from the plant, *Entada phaseoloides*, that has the ability to retard the growth of Walker 256 tumor in rats.

There is wide diversity in the chemical nature of materials isolated from plants. *Entada phaseoloides* is a woody climbing plant common to India, South Africa and the Philippines. (See for instance "The Wealth of India" vol. III [Council of Scientific and Industrial Research, New Delhi 1952], pp. 174–5 and "Index Kewensis" Suppl. V [Oxford 1921].) A number of alkaloids have been reported to possess anti-tumor activities. The active principle extracted from *Entada phaseoloides* is a saponin. Saponins are a type of glycoside widely distributed in plants. All saponins foam strongly when shaken with water. Each saponin consists of a sapogenin which constitutes the aglucon moiety of the molecule, and a sugar. The sapogenin may be a steroid or a triterpene, and the sugar moiety may be glucose, galactose or a pentose.

SUMMARY OF THE INVENTION

The therapeutic material of this invention, obtainable by the evaporation of the methanol-water extract of the seeds of *Entada phaseoloides*, and the purified material as a crystalline solid, inhibit the growth of Walker 256 tumor in rats.

DETAILED DESCRIPTION OF THE INVENTION

Figure 1:
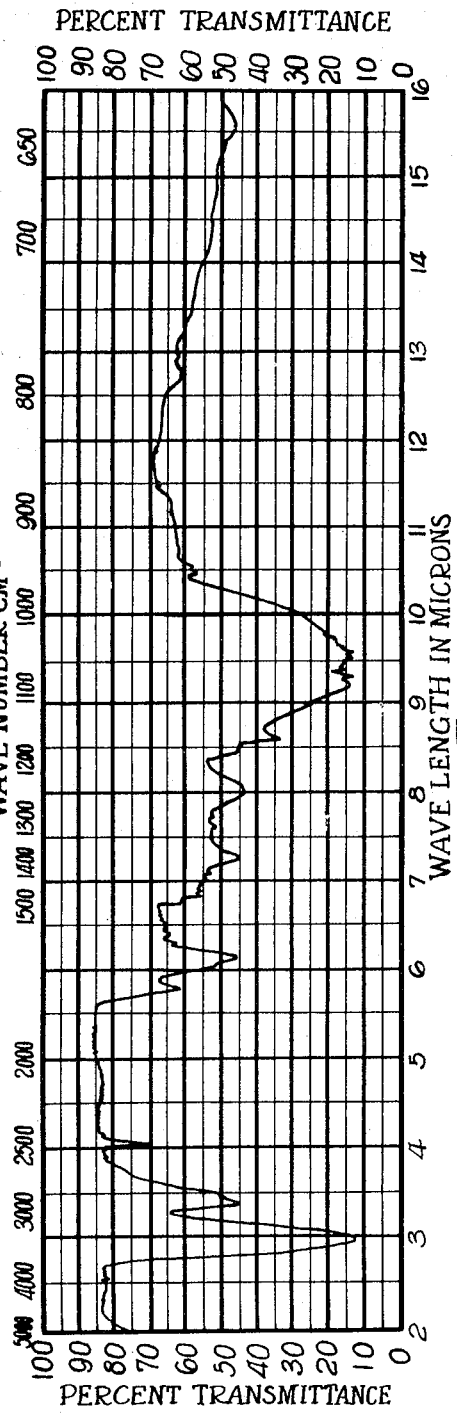

In accordance with the present invention, the active principle is obtained from the ground seeds of *Entada phaseoloides*, a plant found in India. The compound, having the empirical formula $C_{45}H_{82}O_{27}$, as a crystalline solid melts in the range of 223–225° C., is soluble in water, ethanol, methanol and insoluble in acetone, ethyl acetate and chloroform; and exhibits absorption maxima (KBr pellet) in the infra-red region of the spectrum (measured in reciprocal centimeters) at 3400, 2940, 1730, 1640, 1550, 1370, 1245, 1160, 1140–980. (See FIG. 1.) The compound does not exhibit ultraviolet light absorption.

The ability of the needle-like crystals to hemolyze red blood cells, a positive Liebermann-Burchard reaction, and strong foaming of aqueous solutions are characteristic properties of a saponin.

The saponin is isolated by stirring the ground seeds of *Entada phaseoloides* at room temperature for approximately 24 hours with several portions of a defatting solvent such as ligroin, methylene chloride, ethylene chloride, chloroform and ethyl acetate. The solvent is drained, discarded and the residue is extracted twice by stirring for approximately 24 hours at room temperature with a large volume of methanol-water (1:1). The combined extracts after separation from the residue are concentrated in vacuo to remove the alcohol, and the aqueous concentrate is then lyophilized.

The lyophilized solid is dissolved in water and extracted successively with several half-volumes of 10% methanol in butanol. The combined solvent extracts are concentrated in vacuo, and the entrapped water containing the dissolved solids is then lyophilized.

Purification is accomplished by chromatographing the above lyophilized materials on a silicic acid column. A stock eluant is prepared by mixing butanol, ethyl acetate and water (1:1:1). The organic and aqueous layers are separated into an upper phase consisting of butanol and ethyl acetate saturated with water, and a lower phase of water saturated with butanol and ethyl acetate. The lyophilized material is dissolved in a portion of the lower phase and poured on the packed silicic acid column. Elution is carried out with the upper phase. Since the active principle does not exhibit any ultraviolet light absorption, elution is continued until the optical density readings are negligible. At that point, the solvent system is changed to butanol-ethyl acetate-water (2:1:1). The fractions are analyzed by silica gel thin layer chromatography in a solvent system of butanol-acetic acid-water (5:1:4). The spots are located by plate visualization with 254 mu light or Liebermann-Burchard spray (acetic anhydride-$H_2SO_4$ (9:1) followed by heating under an infra-red lamp). The fractions showing no ultraviolet light absorption in conjunction with distinguishing $R_f$ 0.30 are combined an concentrated in vacuo. The active substance, which crystallizes as fine needles during concentration, is collected by filtration and washed with ethyl acetate before drying.

The protocol used in testing against the Walker 256 tumor system in rats is that of Cancer Chemotherapy Reports No. 25, p. 12, December 1962. The tumor cells are implanted intramuscularly in the thigh of non-inbred albino rats, six animals pet test group. Treatment is begun 3 days after implant at one dose daily for 4 days. The animals are sacrificed on the 7th day. The weights of tumors of the test animals are compared with those of control animals. Results are expressed as percent of tumor inhibition.

3

The following examples are merely illustrative and are not intended to limit the invention, the scope of which is defined by the appended claims.

EXAMPLE I

A batch of 10 pound of the ground seeds of *Entada phaseoloides* is stirred twice with 10 liters of ligroin or ethyl acetate for 24 hours. The solvene is drained, discarded and the residue extracted by stirring for 24 hours twice with 10 liters of methanol-water (1:1). The combined extracts, after separation from the residue, are concentrated in vacuo to remove the alcohol, and the aqueous concentrate is then lyophilized. Approximately 600–700 grams of freeze-dried solid is obtained.

A 200 gram sample of the above described freeze-dried solid is dissolved in one liter of water and extracted successively with 700, 600, and 500 ml. of 10% methanol in butanol. The combined extracts are concentrated in vacuo and the remaining aqueous concentrate is lyophilized, yielding 20 grams of solids. The test results of the material, active against the Walker 256 tumor in rats at about 40–60 mg./kg. per day, are shown in the following table.

| Test No. | Daily dose (mg./kg.) | Survival rate | Percent tumor inhibition |
|---|---|---|---|
| 1 | 80 | 0/6 | |
|   | 40 | 6/6 | 71 |
| 2 | 75 | 1/6 | 87 |
|   | 50 | 2/6 | 78 |
|   | 25 | 6/6 | 63 |
| 3 | 50 | 6/6 | 80 |
|   | 25 | 6/6 | 48 |
| Controls | 0 | 6/6 | 0 |

EXAMPLE II

The material of Example I is purified by chromatographing the solids on a silicic acid partition column. The stock eluant is prepard by mixing butanol, ethyl acetate, and water (1:1:1). The organic and aqueous layers are separated thereby generating an upper phase consisting of butanol and ethyl acetate saturated with water, and a lower phase of water saturated with butanol and ethyl acetate. Six hundred (600) grams of silicic acid and powdered cellulose (Solka-Floc, Brown and Co., Berlin, N.H.) 2:1 by weight, are shaken with 60 ml. of the lower phase and an amount of upper phase sufficient to convert the substrate into a free flowing slurry which is packed on to a 45 x 8 cm. column. The sample (40 grams) is dissolved with brief warming in approximately 40 ml. of the lower phase at which point 70 grams of substrate is introduced. As before, enough organic phase is added to make a uniform slurry which is poured on to the packed column. Elution is carried out with the upper phase, and 200 ml. fractions are collected. Since the active principle does not exhibit any ultraviolet light absorption, elution is continued until the optical density readings are negligible. At that point, the solvent system is changed to butanol-ethyl acetate-water (2:1:1). The fractions are analyzed by thin layer chromatography (silica gel G-254, Analtech, Inc., Wilmington, Del.) in a solvent system of butanol-acetic acid-water (5:1:4). The spots are located by plate visualization with 254 m$\mu$ light or Libermann-Burchard spray (acetic acid-$H_2SO_4$ (9:1) followed by heating under an infra-red lamp). The fractions showing no ultraviolet light absorption in conjunction with distinguishing $R_f$ 0.30 are combined and concentrated in vacuo. The active substance, 25 grams, which crystallizes as fine needles during concentration, is collected by filtration and washed with ethyl acetate before drying; M.P. 223–225° C.

*Analysis.*—Cal'd for $C_{45}H_{82}O_{27}$ (percent): C, 51.22; H, 7.83. Found (percent): C, 51.21; H, 7.44.

The test results of the crystalline material, active against the Walker 256 tumor in rats at about 15–30 mg./kg. per day, are shown in the following table.

4

| Test No. | Daily dose (mg./kg.) | Survival rate | Percent tumor inhibition |
|---|---|---|---|
| 1 | 60 | 3/6 | 93 |
|   | 45 | 2/6 | 80 |
|   | 30 | 6/6 | 82 |
|   | 20 | 6/6 | 76 |
|   | 14 | 6/6 | 76 |
| 2 | 60 | 2/6 | 100 |
|   | 45 | 4/6 | 96 |
|   | 30 | 6/6 | 100 |
|   | 20 | 6/6 | 89 |
|   | 14 | 6/6 | 70 |
| 3 | 75 | 5/6 | 89 |
|   | 60 | 5/6 | 84 |
|   | 45 | 6/6 | 79 |
|   | 30 | 6/6 | 72 |
| 4 | 75 | 4/6 | 99 |
|   | 60 | 5/6 | 93 |
|   | 45 | 6/6 | 87 |
|   | 30 | 6/6 | 64 |
| Controls | 0 | 6/6 | 0 |

Figure 2:
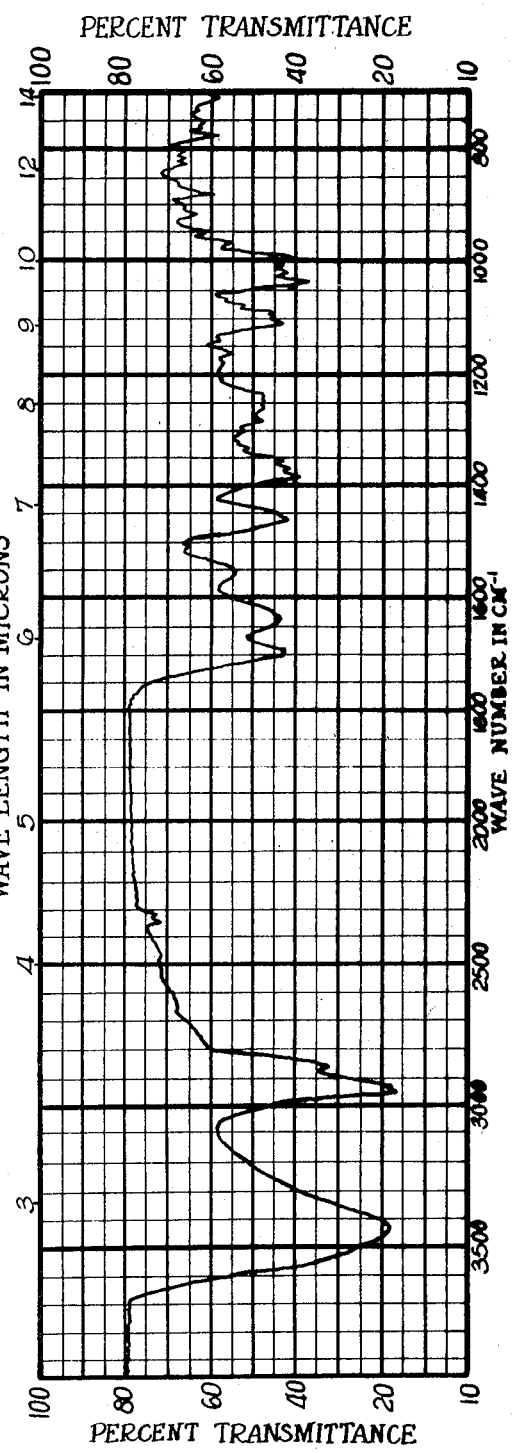

The crystalline saponin can be hydrolyzed by refluxing 0.5 gram of the compound in 50 ml. of 3 N HCl for 5 hours. After the hydrolysis is complete, the mixture is filtered. The residue is washed thoroughly with water and then extracted with methanol. From this clear methanol extract, 40 mg. of crystalline sapogenin is obtained. On recrystallization from methanol-chloroform, crystals are obtained which melt at 310–315° C. The crystals are soluble in methanol, ethanol, partially soluble in chloroform, ethyl acetate, and insoluble in ether and water. The sapogenin has no ultraviolet light absorption. FIG. 2 shows the infra-red spectrum (KBr pellet) which exhibits prominent peaks (measured in reciprocal centimeters) at 3420, 2930, 1695, 1630, 1550, 1460, 1380, 1275, 1250, 1170, 1110, 1035, 995, 970, 950, 920, 880, 780, 750, 710 and 650.

*Analysis.*—Calc'd for $C_{30}H_{48}O_5 \cdot H_2O$: C, 71.11; H, 9.94. Found (percent): C, 7.83; H, 9.94.

The presence of arabinose and xylose in the filtrate after hydrolysis of the saponin is established by side by side comparison with authentic samples of arabinose and xylose by paper chromatography on Whatman No. 1 paper run continuously for 24 hours in a solvent system of ethyl acetate-pyridine-water (12:5:4). The spots are located by spraying with $AgNO_3$ in acetone followed by sodium hydroxide in ethanol.

From its physical and spectral properties, this sapogenin appears to be identical with entagenic acid as described in Burua, A. K., Naturwiss., 43, 250 (1956) and Burua, A. K., Tetrahedron, 23, 1499 (1967).

What is claimed is:

1. A therapeutic compound having the empirical formula, $C_{45}H_{82}O_{27}$, which as a crystalline solid melts in the range of 223–225° C., exhibits absorption maxima (KBr pellet) in the infra-red region of the spectrum (measured in reciprocal centimeters) at 3400, 2940, 1730, 1650, 1550, 1370, 1245, 1160, 1140–980; is soluble in water, ethanol, methanol and insoluble in acetone, ethyl acetate and chloroform; and which on hydrolysis with 3 N HCl yields a mixture of arabinose and xylose and a crystalline sapogenin having the empirical formula, $$C_{30}H_{48}O_5 \cdot H_2O$$

soluble in methanol, ethanol, ethyl acetate, and insoluble in ether and water, melting in the range 310–315 C., exhibiting absorption maxima (KBr pellet) in the infra-red region of the spectrum (measured in reciprocal centimeters) at 3420, 2930, 1695, 1630, 1550, 1460, 1380, 1275, 1250, 1170, 1110, 1035, 995, 970, 950, 920, 880, 780, 750, 710.

2. The method of inhibiting Walker 256 tumor in rats which comprises administering to the animal between about 15 and about 30 mg./kg. per day of the compound of claim 1.

References Cited

Hocking, A Dictionary of Terms in Pharmacognosy, Charles C. Thomas, Springfield, Ill., 1960, p. 76.

JEROME D. GOLDBERG, Primary Examiner